(12) United States Patent
Kim et al.

(10) Patent No.: US 9,246,578 B2
(45) Date of Patent: Jan. 26, 2016

(54) METHOD FOR ALLOCATING CDMA CHANNELS

(75) Inventors: Young-Jun Kim, Gueonggi-Do (KR); Chan-Ho Kyung, Gyeonggi-Do (KR); Jong-Hoe An, Seoul (KR)

(73) Assignee: LG ELECTRONICS INC., Seoul (KR)

(*) Notice: Subject to any disclaimer, the term of this patent is extended or adjusted under 35 U.S.C. 154(b) by 672 days.

(21) Appl. No.: 11/469,762

(22) Filed: Sep. 1, 2006

(65) Prior Publication Data

US 2007/0058592 A1    Mar. 15, 2007

(30) Foreign Application Priority Data

Sep. 2, 2005  (KR) .................. 10-2005-0081828
Sep. 8, 2005  (KR) .................. 10-2005-0083897

(51) Int. Cl.
| | | |
|---|---|---|
| *H04B 7/26* | (2006.01) | |
| *H04J 13/16* | (2011.01) | |
| *H04W 72/04* | (2009.01) | |

(52) U.S. Cl.
CPC .............. *H04B 7/2634* (2013.01); *H04J 13/16* (2013.01); *H04W 72/042* (2013.01)

(58) Field of Classification Search
CPC ... H04B 7/2628; H04B 7/2634; H04W 36/00; H04W 36/0005; H04W 36/0083; H04W 72/00; H04W 72/04; H04W 72/0406; H04W 72/042; H04W 72/044; H04W 72/0453; H04W 72/0466; H04W 72/0486; H04W 72/12; H04W 72/1278; H04W 72/1289; H04L 5/00; H04L 5/003; H04L 5/0037; H04L 5/0091; H04L 5/0092; H04L 5/0094; H04L 5/0096; H04J 13/00; H04J 13/16

USPC .............. 455/464, 562.1, 436–444, 450–453; 370/431, 252, 328–336, 341–342, 441
See application file for complete search history.

(56) References Cited

U.S. PATENT DOCUMENTS

| | | | |
|---|---|---|---|
| 5,737,704 A | | 4/1998 | Jin et al. |
| 6,128,328 A | * | 10/2000 | Schilling ....................... 375/134 |
| 2002/0160783 A1 | * | 10/2002 | Holtzman et al. ............ 455/452 |
| 2002/0172163 A1 | | 11/2002 | Chen et al. |

(Continued)

FOREIGN PATENT DOCUMENTS

| | | |
|---|---|---|
| EP | 1296459 | 3/2003 |
| JP | 2004-072459 | 4/2004 |

(Continued)

OTHER PUBLICATIONS

"CDMA 2000 High Rate Packet Data Air Interface Specification" 3GPP2 C.S0024 Version 2.0 Date: Oct. 27, 2000.*

(Continued)

*Primary Examiner* — Michael Mapa
(74) *Attorney, Agent, or Firm* — Lee, Hong, Degerman, Kang & Waimey

(57) ABSTRACT

A method for allocating CDMA channels applicable to a mobile communication system that performs communication by using two or more CDMA channels, the method comprising: for each active sector corresponding to a particular mobile station, independently allocating CDMA channels (i.e., frequency assignments) such that each active sector is allocated at least one CDMA channel; and transmitting packet data by using the allocated CDMA channel.

12 Claims, 2 Drawing Sheets

(56) References Cited

U.S. PATENT DOCUMENTS

| | | | |
|---|---|---|---|
| 2003/0203735 A1* | 10/2003 | Andrus et al. | 455/450 |
| 2003/0211850 A1* | 11/2003 | Chen et al. | 455/442 |
| 2004/0081111 A1* | 4/2004 | Bae et al. | 370/316 |
| 2004/0114549 A1 | 6/2004 | Miyoshi | |
| 2004/0202131 A1* | 10/2004 | An et al. | 370/331 |
| 2005/0111397 A1* | 5/2005 | Attar et al. | 370/319 |
| 2005/0288020 A1 | 12/2005 | Cho et al. | |
| 2006/0203779 A1* | 9/2006 | Attar et al. | 370/335 |
| 2006/0205415 A1* | 9/2006 | Rezaiifar | H04L 5/0007 455/452.2 |
| 2006/0221883 A1 | 10/2006 | Damnjanovic et al. | |
| 2006/0229091 A1* | 10/2006 | Rezaiifar et al. | 455/509 |
| 2006/0291371 A1* | 12/2006 | Sutivong et al. | 370/208 |

FOREIGN PATENT DOCUMENTS

| | | |
|---|---|---|
| KR | 10-0395510 | 8/2003 |
| RU | 2211534 | 8/2003 |
| WO | 00/51390 | 8/2000 |
| WO | 0150782 | 7/2001 |
| WO | 2004/112419 | 12/2004 |
| WO | WO 2004-114549 A1 | 12/2004 |
| WO | 2007027070 | 3/2007 |

OTHER PUBLICATIONS

3rd Generation Partnership Project 2 (3GPP2), "CDMA2000 High Rate Packet Data Air Interface Specification," 3GPP2 C.S0024-A, Ver. 1.5, pp. 8:101-109 and 8:154-63, Jul. 2005.

Nortel Networks, "cdma2000 High Rate Packet Data Air Interface Specification," C.P0024-B_v0.1 V&V Comment, Technical Document Discrepancy Report, Feb. 2006.

Nortel Networks, "cdma2000 High Rate Packet Data Air Interface Specification," TIA-856-B Ballot Comment or 3GPP2 C.S0024-B V&V Comment, Technical Document Discrepancy Report, Feb. 2006.

In the Intellectual Property Office of China Application Serial No. 200680031704.9, Office Action dated Nov. 5, 2012, 3 pages.

* cited by examiner

METHOD FOR ALLOCATING CDMA CHANNELS

CLAIM FOR PRIORITY

Pursuant to 35 U.S.C. 119(a), this application claims the benefit of earlier filing date and right of priority to Korean Application Nos. 10-2005-0081828, filed on Sep. 2, 2005, and 10-2005-0083897, filed on Sep. 8, 2005, the contents of which are all hereby incorporated by reference herein in its entirety.

FIELD OF THE INVENTION

The present invention relates to a method for allocating CDMA channels, and in particular, relates to a method for independently allocating CDMA channels for each active sector.

BACKGROUND ART

An HRPD (High Rate Packet Data) is a standard for wireless (radio) access technology that is optimized for high speed, high capacity data transmissions. The HRPD system applies Code Division Multiple Access (CDMA) technology and Time Division Multiplexing (TDM) technology to allow a mobile station to transmit data. Accordingly, due to its improved data transmission rate and capacity, the HRPD system can provide multimedia contents in various technical fields of application, such as wireless Internet access, real-time road traffic information, wireless live broadcasts, movies, games and the like.

In order to transmit large capacity data at a higher rate, an Nx HRPD system transmits packets upon allocating more than one CDMA channel (frequency assignment) to one mobile station. Namely, a method that transmits packets by using a multi-carrier is employed.

According to the related art, in a system that transmits packets by using a multi-carrier, the same CDMA channel (frequency assignment) is allocated to the active sectors. Namely, allocating the CDMA channel (frequency assignment) to all other active sectors in the same manner as that for a serving sector, which is currently transmitting packet data to a particular mobile station, is problematic because of inefficiencies from the point of radio resource management.

Also, in the related art, when data is transmitted by using the allocated CDMA channels (FAs), no determination is made as to whether which of the many CDMA channels (FAs) should be used to transmit control messages. However, because control signals can be considered to be more important than traffic data, there is a need to transmit such control signals in a more effective manner.

SUMMARY

The present invention has been developed in order to solve the above described problems of the related art. As a result, the present invention provides a method for allocating CDMA channels (frequency assignment) in an efficient manner to each active sector in a mobile communication system, such as a HRPD (High Rate Packet Data) system. Among the allocated CDMA channels, one may be selected and used for transmitting control signals.

DESCRIPTION

One aspect of the present invention is the recognition by the present inventor regarding the problems and drawbacks of the related art described above and explained in more detail hereafter. Based upon such recognition, the features of the present invention have been developed.

To solve the related art problems, the present invention provides a method for allocating CDMA channels (frequency assignments) applicable to a mobile communication system that performs communications by using two or more CDMA channels, the method comprising: for each active sector corresponding to a particular mobile station, independently allocating CDMA channels (frequency assignment) such that each active sector is allocated at least one CDMA channel (frequency assignment); and transmitting packet data by using the allocated CDMA channel (frequency assignment).

Various features and aspects of the present invention will be better understood through the following description in relation to the attached drawings. With reference to the attached drawings, some exemplary embodiments of the present invention will be described.

Figure 1:
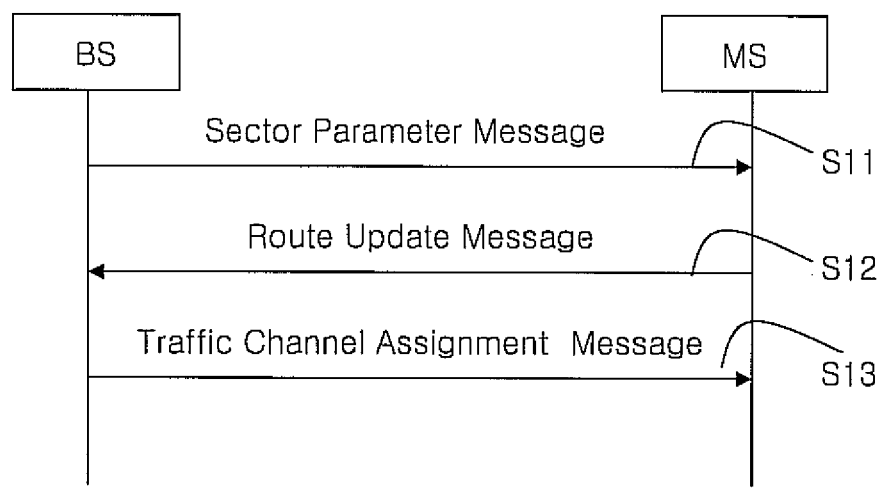
FIG. 1 shows a flow chart of an exemplary procedure of transmitting and receiving messages between a mobile station and a base station according to an embodiment of the present invention.

FIG. 1 shows a flow chart of an exemplary procedure of transmitting and receiving messages between a mobile station and a base station according to the present invention.

Referring to FIG. 1, the base station transmits to the mobile station, information related to the total number of frequency assignments (FA) (or CDMA channels) that can handle high speed data rate services. Here, the information related to the total number of CDMA channels (FAs) may be transmitted via a sector parameter message (S11).

The following Table 1 shows an example of a sector parameter message used in the present invention.

TABLE 1

| Field | Length (bits) |
| --- | --- |
| MessageID | 8 |
| CountryCode | 12 |
| SectorID | 128 |
| SubnetMask | 8 |
| [ . . . ] | |
| Channelcount | 5 |
| ChannelCount occurrences of the following field: | |
| Channelcount | 24 |
| [ . . . ] | |
| Reserved | 0-7 (as needed) |

Referring back to FIG. 1, if the mobile station changes from idle mode to connected state, or if an active sector list is updated when in the connected state, the mobile station transmits information related to the active sectors to the base station. The information related to the active sectors may be transmitted via a route update message (S12).

It should be noted that a cell may be typically divided into three areas (portions). An active sector may be defined as one or more areas of a single cell, or a combination of one or more areas of two or more different cells. An active sector can be said to have the strongest link to the mobile station. Such active sectors are defined to allow fast cell selection.

When fast cell selection (FCS) is employed, the terminal (mobile station) makes recommendations on the best cell for downlink packet transmission and signals this to the network. Determination of the best cell may not only be based on radio propagation conditions, but also, available resources (such as power and code space for the cells in the active set) may be considered. Different wireless systems vary from each other on the actual implementation of fast cell selection, and in particular, on whether the terminal or the network makes the decision about the cell for the next downlink packet transmission. For example, in CDMA2000 1x EV-DO the network follows the terminal's recommendation, while in CDMA2000 1x EV-DV the network makes the decisions taking into account also available resources.

The following Table 2 shows an example of a route update message according to the present invention.

TABLE 2

| Field | Length (bits) |
|---|---|
| MessageID | 8 |
| MessageSequence | 8 |
| ReferencePilotPN | 9 |
| ReferencePilotStrength | 6 |
| ReferenceKeep | 1 |
| NumPilots | 4 |
| NumPilots occurrences of the following fields: | |
| PilotPNPhase | 15 |
| ChannelIncluded | 1 |
| Channel | 0 or 24 |
| PilotStrength | 6 |
| Keep | 1 |
| Reserved | variable |

Referring back to FIG. 1, upon receiving the information related to the active sectors via the route update message, the base station transmits to a mobile station, CDMA channel (FA) allocation information for transmitting packet data. The CDMA channel (FA) allocation information may be transmitted via a traffic channel assignment message (S13).

The following Table 3 shows an example of a traffic channel assignment message.

TABLE 3

| Field | Length (bits) |
|---|---|
| MessageID | 8 |
| MessageSequence | 8 |
| ChannelIncluded | 1 |
| Channel | 0 or 24 |
| FrameOffset | 4 |
| DRCLength | 2 |
| DRCChannelGainBase | 6 |
| ACKChannleGain | 6 |
| NumPilots | 4 |
| NumPilots occurrence of the following record: | |
| PilotPN | 9 |
| SofterHandoff | 1 |
| MACIndexLSBs | 6 |
| DRCCover | 3 |
| RABLength | 2 |
| RABOffset | 3 |
| RAChannelGainIncluded | 0 or 1 |
| NumPilots occurrences of the following field: | |
| RAChannelGain | 0 or 2 |
| MACIndexMSBsIncluded | 0 or 1 |

TABLE 3-continued

| Field | Length (bits) |
|---|---|
| NumPilots occurrences of the following field: | |
| MACIndexMSB | 0 or 1 |
| DSCChannelGainBase | 0 or 5 |
| 0 or N occurrences of the following field, where N is the number of SoftHandoff fields set to '0' in this message | |
| DSC | 0 or 3 |
| Reserved | Variable |

As can be seen from Table 3, numerous fields having different lengths (bits) are used to specify various parameters to be used in traffic channel assignment. Some of these fields will be explained in the context of a non-limiting example described hereafter. Certain fields that are not described in detail can nevertheless be clearly understood by those having ordinary skill in the art.

Figure 2:
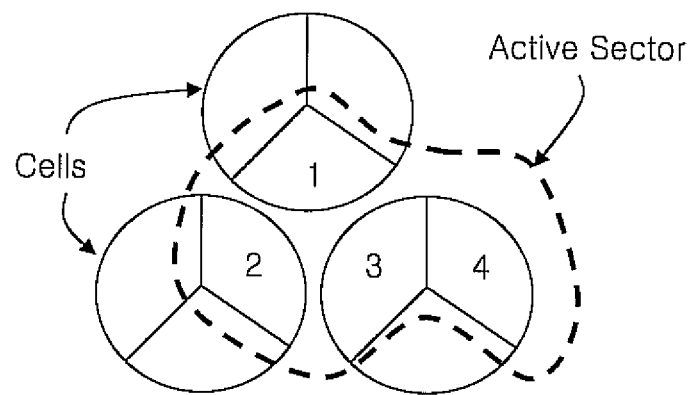
FIG. 2 shows an example of an active sector with four sectors from three cells according to an embodiment of the present invention.

FIG. 2 shows an example of an active sector with four sectors from three cells according to an embodiment of the present invention. However, this is merely exemplary, as the number of cells and sectors may be varied accordingly.

Figure 3:
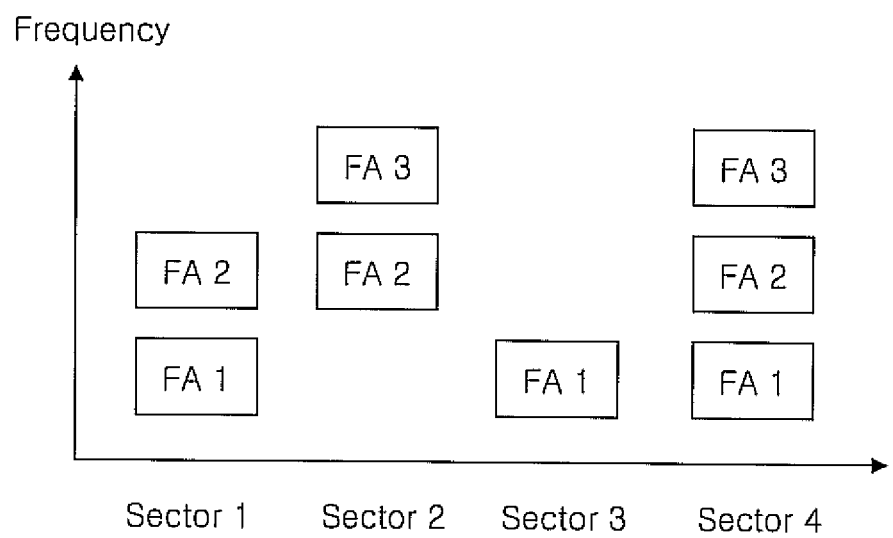
FIG. 3 shows an example of a method for allocating CDMA channels (frequency assignment: FA) in an independent manner with respect to each sector, according to an embodiment of the present invention.

FIG. 3 shows an example of a method for allocating CDMA channels (frequency assignment: FA) in an independent manner with respect to each sector, according to the present invention. FIG. 3 shows an exemplary method of how three CDMA channels (FAs) are allocated to four active sectors.

In the embodiment of FIGS. 2 and 3, the active sector with respect to a mobile station has a first sector, a second sector, a third sector, and a fourth sector (i.e., sectors 1 through 4). As shown in FIG. 3, CDMA channels (FAs) may be allocated independently for each active sector. Namely, FA 1 and FA 2 may be allocated with respect to sector 1, while FA 2 and FA 3 may be allocated with respect to sector 2. It should be noted that the total number of CDMA channels (FAs) allocated with respect to each active sector may be different. Namely, as shown in FIG. 3, a total of two CDMA channels (FAs) may be allocated with respect to sectors 1 and 2, a single CDMA channel (FA) may be allocated with respect to sector 3, and a total of three CDMA channels (FAs) may be allocated with respect to sector 4.

From the viewpoint of CDMA channels (frequency assignment), FA 1 is allocated to sectors 1, 3, and 4, FA 2 is allocated to sectors 1, 2, and 4, and FA 3 is allocated to sectors 2 and 4.

As described above, when CDMA channels (FAs) are allocated independently with respect to each active sector, the total number of CDMA channels (FAs) that can be allocated with respect to all active sectors are set in advance, and the number of CDMA channels (FAs) to be allocated, based upon channel or load conditions of each sector, can be determined from among the total number of CDMA channels (FAs). Although FIG. 5 depicts an exemplary method of allocating continuous CDMA channels (FAs) with respect to a single sector, CDMA channels (FAs) such as FA 1 and FA 3 may be allocated in a non-continuous manner to a single sector.

As described above, if CDMA channels (FAs) are allocated independently for each active sector, there is a need to transmit to the mobile station, information related to CDMA channel (FA) allocation. This FA allocation information to be transmitted may include information related to the entire COMA channels (FAs) that can be allocated and either information related to the CDMA channel (FA) to be allocated for each sector or information related to the sector(s) being allocated each CDMA channel (FA). This FA allocation information may be transmitted via a traffic channel assignment message.

The following Table 4 shows an example of a traffic channel assignment message.

TABLE 4

| Field | Length (bits) |
|---|---|
| MessageID | 8 |
| MessageSequence | 8 |
| [ . . . ] | |
| NumSectors | 3 |
| NumForwardChannels | 4 |
| [ . . . ] | |
| NumSectors occurrences of the following SectorInformation record: | |
| [ . . . ] | |
| PilotPN | 9 |
| DRCCover | 3 |
| [ . . . ] | |
| NumForwardChannels occurrences of the following ActiveSetParameters record (starting from AssignedChannel and ending at MACIndex, inclusive): | |
| { | |
| Assigned Channel | 0 or 24 |
| [ . . . ] | |
| NumAssignedSectors | 3 |
| NumAssignedSectors occurrences of the following record: | |
| { | |
| AssignedSectorIndex | 3 |
| [ . . . ] | |
| TrafficMACIndex | 3 |
| [ . . . ] | |
| MACIndex | 0 or 8 |
| } | |
| [ . . . ] | |
| Reserved | Variable |

The traffic channel assignment message may include active sector allocation information for a particular mobile station and information related to the CDMA channels (FAs) to be allocated to the active sector.

In the example shown in Table 4, the NumSectors field indicates the information related to the current number of active sectors with respect to a particular mobile station. The NumForwardChannels field indicates the total number of CDMA channels (FAs) allocated to all active sectors.

Also, the traffic channel assignment message may include information related to each active cell, namely, information related to the pilot PN code and DRC cover of each active sector. In the example of Table 4, the PN code related information is indicated by using a PilotPN field, and the DRC cover related information is indicated by using a DRCCover field.

Additionally, the traffic channel assignment message may contain information related to the active sector allocated to each CDMA channel (FA). Namely, in the example shown in Table 4, the AssignedChannel field refers to a particular CDMA channel (FA). Also, the NumAssignedSectors refers to the number of sectors allocated to the particular CDMA channel (FA). Furthermore, the amount (number) of information related to the active sector corresponds to the total number of active sectors. Also, in the example of Table 4, the AssignedSectorIndex field indicates the active sector allocated to that particular CDMA channel (FA), and the TrafficMACIndex field refers to an index for a packet service of a mobile station having the CDMA channel (FA) allocated thereto. The MAC Index refers to the MAC Index for power control of the reverse link having the CDMA channel (FA) allocated thereto.

As in the example of Table 4, the traffic channel assignment message, on the basis of the particular CDMA channel (FA), may include information related to each active sector having the particular CDMA channel (FA) allocated thereto (i.e., AssignedSectorIndex~MACIndex in Table 4), as well as information related to each and every active sector having the particular CDMA channel (FA) allocated thereto (i.e., AssignedSectorIndex~MACindex in the Table 4).

By using the method described above, the traffic channel assignment message contains CDMA channel (FA) related information for each and every CDMA channel (FA) (i.e., AssignedChannel~NumAssignedSectors in Table 4), and information related to the active sector having the CDMA channel (FA) allocated thereto (i.e., AssignedSectorIndex~MACindex in Table 4).

By employing the traffic channel assignment message shown in the Table 4, the COMA channel (FA) allocation method such as that of FIGS. 2 and 3 may be expressed as follows.

First, because there are four active sectors having FAs allocated thereto, the NumSectors field has a value of 4. As the total number of allocated FAs is three, the NumForwardChannels field has a value of 3. Each of the four active sectors includes active sector information having a PilotPN field and a DRCCover field.

Also, first of all, the AssignedChannel field value corresponding to FA 1 is included. As FA 1 is allocated to sector 1, sector 3, and sector 4, the NumAssignedSectors field has a value of 3. Meanwhile, the AssignedSectorIndex field~MACIndex field value is included to correspond to the total number of sectors having FA 1 allocated thereto. Namely, the AssignedSectorIndex field~MACIndex field are included with respect to sector 1, sector 3, and sector 4.

Additionally, the AssignedChannel field value corresponding to FA 2 is included. As FA 2 is allocated to sector 1, sector 2, and sector 4, the NumAssignedSectors field has a value of 3. Meanwhile, the AssignedSectorIndex field~MACindex field value is included to correspond to the total number of sectors having FA 2 allocated thereto. Namely, the AssignedSectorIndex field~MACIndex field are included with respect to sector 1, sector 2, and sector 4.

Additionally, the AssignedChannel field value corresponding to FA 3 is included. As FA 3 is allocated to sector 2 and sector 4, the NumAssignedSectors field has a value of 2. Meanwhile, the AssignedSectorIndex field~MACIndex field value is included to correspond to the total number of sectors having FA 3 allocated thereto. Namely, the AssignedSectorIndex field~MACIndex field are included with respect to sector 2 and sector 4.

As described above, although the traffic channel assignment message may be expressed in terms of the information related to sectors being allocated per each CDMA channel (FA), it may also be expressed in terms of information related to CDMA channels (FAs) being allocated per each sector.

As a result of the present invention, CDMA channels (frequency assignments: FAs) are allocated independently to be appropriate for the conditions of each active sector, and thus, more efficient use of radio resources is possible.

The present invention provides a method for allocating CDMA channels applicable to a mobile communication system that performs communication by using two or more CDMA channels, the method comprising: allocating CDMA channels in an independent manner, the allocating being performed with respect to each active sector corresponding to a particular mobile station, wherein each active sector is respectively allocated at least one CDMA channel; and transmitting packet data using said allocated frequency assignment.

The method may further comprise: transmitting a message comprising information related to the two of more channels and information related to active sectors having the CDMA channels allocated thereto. The message may be a traffic channel assignment message. The traffic channel assignment message may comprise information related to the number of active sectors and the number of CDMA channels. The traffic channel assignment message may further comprise pilot PN information and DRC cover information related to each active sector. The traffic channel assignment message may further comprise information related to each CDMA channel and information related to the active sector having one or more CDMA channels allocated thereto. The traffic channel assignment message may further comprise information related to each active sector and information related to each CDMA channel allocated to each active sector. The mobile communication system may be a Nx High Rate Packet Data system. One among a plurality of allocated CDMA channels may be selected and used for transmitting a forward link control signal.

Also, the present invention provides, with respect to a mobile station, a method for allocating CDMA channels applicable to a mobile communication system that performs communication by using two or more CDMA channels, the method comprising: allocating a first set of CDMA channels for a first sector of an active sector of the mobile station; allocating a second set of CDMA channels for a second sector of the active sector of the mobile station; and transmitting packets by using the allocated CDMA channels.

The method may further comprise: transmitting a traffic channel assignment message that comprises information related to the allocated CDMA channels. The traffic channel assignment message may comprise: a first part comprising information related to the number of active cells and the number of CDMA channels; a second part comprising information of each active sector; and a third part comprising information of the active sectors allocated for each CDMA channel. The traffic channel assignment message may comprise: a first part comprising information related to the number of active cells and the number of CDMA channels; a second part comprising information of each active sector; and a third part comprising information of the CDMA channel being allocated to each active sector. The method may further comprise: updating an active sector list comprising the active sectors; and transmitting a traffic channel assignment message comprising information of the CDMA channels allocated to the updated active sectors. One among a plurality of allocated CDMA channels may be selected and used for transmitting a forward link control signal.

Also, the present invention provides a method for allocating CDMA channels applicable to a mobile communication system that performs communication by using two or more CDMA channels, the method comprising: receiving a traffic channel assignment message comprising information related to CDMA channels allocated independently with respect to each active sector corresponding to a particular mobile station; and receiving packet data from a base station by using the CDMA channels according to the received traffic channel assignment message.

Furthermore, the present invention provides a mobile station comprising: a transceiver adapted to transmit and receive signals with a mobile communication network; and a processor adapted to receive, via the transceiver, information related to traffic channels that were allocated independently by the network with respect to each active sector corresponding to the mobile station, and to receive, via the transceiver, packet data from the network by using the traffic channels based upon the received information.

The active sector may refer to one or more areas of a single cell, or a combination of one or more areas of two or more different cells, and wherein the active sector has the strongest link to the mobile station and allows fast cell selection. The information may be received from the network via a message that indicates traffic channel assignment. The processor may cooperate with the transceiver to receive a message from the network that indicates the total number of CDMA channels that can handle high speed data rate services, wherein the receiving is performed prior to receiving the message that indicates traffic channel assignment. The processor may cooperate with the transceiver to transmit a message to the network that includes information the active sector, wherein the transmitting is performed prior to receiving the message that indicates traffic channel assignment, in response to the received message that indicates the total number of CDMA channels, if the mobile station changes from an idle mode to a connected state, or if an active sector list is updated when in the connected state. The mobile communication network may be a COMA network, and the traffic channels are CDMA channels. One among a plurality of allocated traffic channels was independently selected by the network for each active sector and used for receiving a control signal.

It should be noted that the above described features of the present invention are related to at least the 3GPP2 standard. Namely, 3GPP2 TSG-C WG3 C.S0024-B and its related sections or portions thereof, as well as various developing enhancements thereof pertain to the present invention. The features of the present invention are described by using certain terms and labels. However, it can be clearly understood that such labeling and other terminology are merely exemplary and thus may be altered (or later clarified) as a result of ongoing or future discussions.

Also, the features of the present invention may be implemented in various products. One non-limiting example would be a mobile station and/or a network that supports cdma2000 1x EV-DO HRPD Rev.B. However, it can be clearly understood that other implementations are possible.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of data communications in a High Rate Packet Data (HRPD) system using two or more code division multiple access (CDMA) channels, the method comprising: transmitting, by a base station to a mobile station, a sector parameter message including information related to a total number of CDMA channels; receiving, by the base station, information for allocating the CDMA channels to an active sector of the plurality of sectors, wherein the information contains information related to frequency assignment of the CDMA channels; and transmitting, from the base station, a traffic channel assignment message that contains information related to an allocation of the CDMA channels, wherein the information for allocating the CDMA channels is used in independent allocations of a certain number of CDMA channels to each active sector among the plurality of sectors in the multiple cells serving the mobile station, wherein the certain number of CDMA channels to each active sector is independently allocated from the total number of CDMA channels based on channel or load conditions of each active sector, wherein the information for allocating the CDMA channels comprises a field associated with a message identification, a field associated with a message sequence, a field associated with the plurality of sectors, and a field associated with forward link CDMA channels, wherein the each active sector among the plurality of sectors is a combination of one or more areas of the multiple cells, wherein the field associated with the plurality of sectors is used to indicate sector information with respect to a pilot pseudo-noise (PN) code and a data rate control cover, and wherein the field associated with the forward link CDMA channels indicates a number of the forward link CDMA channels associated with the each active sector serving the mobile station and corresponding to the data rate control cover; and transmitting, from the base station, packet data to the mobile station via the CDMA channels that are allocated according to the transmitted traffic channel assignment message.

2. The method of claim 1, further comprising:
  transmitting, from the base station via the channel assignment message, control information related to the allocated CDMA channels and the number of forward link CDMA channels associated with the each active sector serving the mobile station and corresponding to the data rate control cover.

3. The method of claim 1, further comprising transmitting, from the base station, information indicating in which of the allocated CDMA channels a control message exists.

4. The method of claim 3, wherein the control message comprises control information related to the packet data.

5. The method of claim 1, further comprising transmitting, from the base station, the packet data via at least two of the CDMA channels at the same time.

6. The method of claim 1, wherein the mobile communication system is a multi-carrier system.

7. A method of data communications in a High Rate Packet Data (HRPD) system using two or more code division multiple access (CDMA) channels, the method comprising: receiving, by a mobile station from a base station, a sector parameter message including information related to a total number of CDMA channels; transmitting, at the mobile station, information for allocating the CDMA channels to an active sector of the plurality of sectors, wherein the information contains information related to frequency assignment of the CDMA channels; receiving, at the mobile station, a traffic channel assignment message that contains information related to an allocation of the CDMA channels, wherein the information for allocating the CDMA channels is used in independent allocations of a certain number of CDMA channels to each active sector among the plurality of sectors in the multiple cells serving the mobile station, wherein the certain number of CDMA channels to each active sector is independently allocated from the total number of CDMA channels based on channel or load conditions of each active sector, wherein the information for allocating the CDMA channels comprises a field associated with a message identification, a field associated with a message sequence, a field associated with the plurality of sectors, and a field associated with forward link CDMA channels, wherein the each active sector among the plurality of sectors is a combination of one or more areas of the multiple cells, wherein the field associated with the plurality of sectors indicates sector information with respect to a pilot pseudo-noise (PN) code and a data rate control cover, and wherein the field associated with the forward link CDMA channels is used to indicate a number of the forward link CDMA channels associated with the each active sector serving the mobile station and corresponding to the data rate control cover; and receiving, at the mobile station, packet data via the CDMA channels that are allocated according to the received traffic channel assignment message.

8. The method of claim 7, further comprising receiving, at the mobile station, information indicating in which of the allocated CDMA channels a control message exists.

9. The method of claim 7, further comprising receiving, at the mobile station, the packet data via at least two of the CDMA channels at the same time.

10. The method of claim 7, wherein the mobile communication system is a multi-carrier system.

11. The method of claim 8, wherein the control message comprises control information related to the packet data.

12. The method of claim 7, further comprising:
  receiving, at the mobile station via the traffic channel assignment message, control information related to the allocated CDMA channels and the number of forward link CDMA channels and corresponding to the data rate control cover.

\* \* \* \* \*